Figure 1:
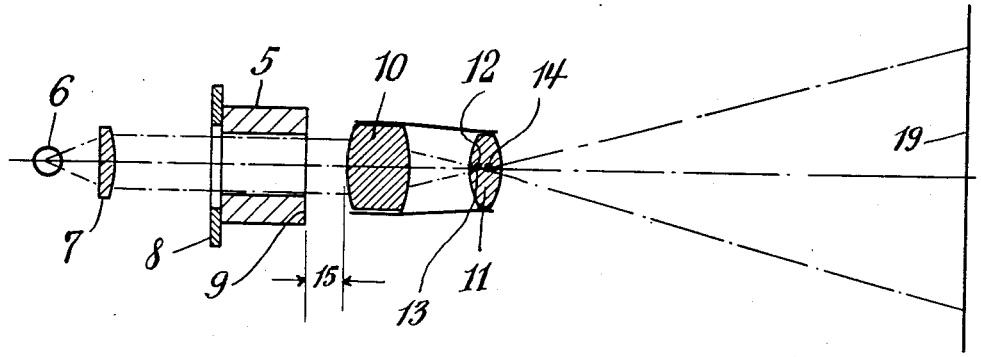

Sept. 16, 1941.    O. ZIMMERMANN    2,256,228
OPTICAL SYSTEM FOR MEASURING PURPOSES
Filed June 5, 1940

Otto Zimmermann
INVENTOR

Patented Sept. 16, 1941

2,256,228

UNITED STATES PATENT OFFICE 2,256,228

OPTICAL SYSTEM FOR MEASURING PURPOSES

Otto Zimmermann, Wetzlar, Germany

Application June 5, 1940, Serial No. 338,891
In Germany March 2, 1939

3 Claims. (Cl. 88—57)

This invention relates to optical systems for use in optical measuring projection apparatus where usually a fixed enlargement is demanded which in turn require a fixed distance between the plane of observation of the object and the plane in which the image is projected. For practical reasons therefore the objective and the screen are fixedly mounted so that when the objective has been focused both of these parts cannot be moved along the optical axis of the apparatus. If the object is very thick or high the focussing is done by moving the stage upon which the object rests or is mounted. Because of the demands for stability and the exactness of the measuring operation the range of movement of the stage cannot exceed a certain limit within which such objects can be measured. Hence objects which cannot be adjusted within this limit cannot be so measured. There are also cases in which recessed or remote parts of an object are to be measured. If such parts are a greater distance from the upper edge or plane of the object than the free working distance it is impossible to measure them because the upper edge of the object could not pass beneath or by the edge of the objective.

The object of the invention is to provide an optical system whereby it is possible to vary the distance between objective and the observation plane by optical means and whereby the aforesaid disadvantages are avoided.

The invention is embodied in an optical system which consists of two elements each of which may consist of several parts. The first element is positive and corrected. The second element is positive or negative depending upon the direction in which the optical effect according to the invention is to operate. The second element is preferably a single element. The distance between the two elements of the entire system is so selected that the rear focal point of the first element coincides with the first principal point of the second element. The second element in such a system has no influence upon the focal length of the system. If the second element is changed with respect to the refracting power thereof then the focal length of the systems remain unchanged and only the distance between the apex of the first lens and the first focal point of the whole system is decreased or increased according to whether the refracting power is positive or negative. The free working distance is varied in the same sense and to the same extent. By these means one is able to adjust or vary the free working distance within relatively wide limits so that the proportions of enlargement may remain constant by substituting the second element with another element having different refracting power.

The arrangement in the optical system may be very simple if the second element consists of a simple symmetric lens either double convex or double concave because, by retaining the same lens thickness, the principal points of the element do not change their position. Also, by maintaining the required distance between the two main elements both the focal length and the location of the rear principal point of the entire system remain unchanged and the dimension of the projected picture and the proportion of the enlargement remain strictly constant irrespective of the refractive power of the second element.

The system is illuminated by a parallel beam of light hence the rays meet in the rear focal point of the first element after having passed through the same.

Inasmuch as the second element is located at this point practically only the middle portion of the second element is called upon to function. Hence by changing the second element in accordance with this invention the condition of correction of the system is influenced very little if at all.

Figure 2:
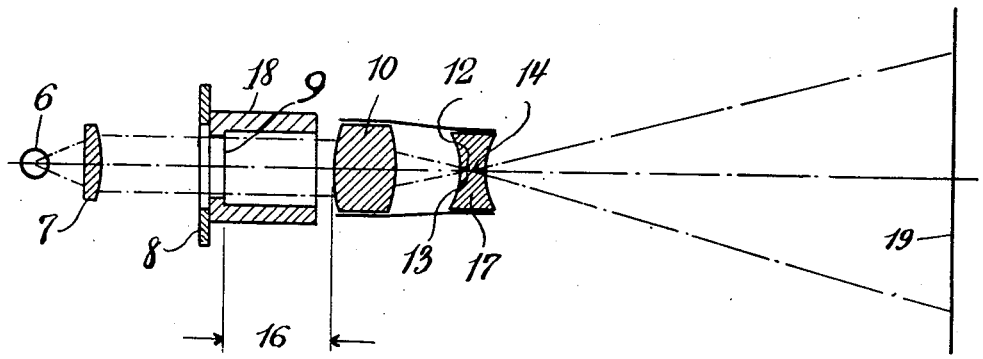

The invention is illustrated diagrammatically in the accompanying drawing in which Fig. 1 shows the optical system including a positive second element. Fig. 2 shows the same system but with a negative second element.

In the drawing the object 5 is illuminated by a parallel beam of light from the lamp 6, which passes through the condenser lens 7. The object 5 rests upon or is suitably mounted upon the object stage or support 8. The plane of the object which is to be measured or checked is located at 9. The first element in the optical system is marked 10, the second element is marked 11. The rear focal point of the first element 10 is at 12. The second element 11 has its first principal point at 13 and its second rear principal point at 14. In accordance with the invention the two points 12 and 13 coincide. The free working distance is marked 15 in Fig. 1 which is changed to another free working distance 16 in Fig. 2 by substituting in Fig. 2 a negative element 17. In Fig. 2 the different object on the stage 8 is marked 18. The projection screen is at 19. The free working distance is materially increased in Fig. 2 so that it is possible to project images of deeper or remoter parts of the object.

I claim:

1. In an optical system for use in optical measuring projection apparatus, said system consisting of two optical lens elements, the first element being a positive element, means for fixedly supporting and spacing said elements so that the rear focal point of said first element coincides with the first principal point of the second element and means for illuminating the object to be projected by said system with a parallel beam of light.

2. An optical system according to claim 1 in which the second element is a single bi-concave lens.

3. An optical system according to claim 1 in which the second element is a single positive lens.

OTTO ZIMMERMANN.